(12) United States Patent
Yang et al.

(10) Patent No.: US 12,281,946 B1
(45) Date of Patent: Apr. 22, 2025

(54) DIFFERENTIAL PROPORTIONAL TEMPERATURE MEASUREMENT CIRCUIT AND METHOD BASED ON BIDIRECTIONAL CONSTANT VOLTAGE DRIVE

(71) Applicant: Harbin Institute of Technology, Harbin (CN)

(72) Inventors: Hongxing Yang, Harbin (CN); Shiyuan Lin, Harbin (CN); Ziqi Yin, Harbin (CN); Yan Wang, Harbin (CN); Pengcheng Hu, Harbin (CN); Ruitao Yang, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/942,832

(22) Filed: Nov. 11, 2024

(30) Foreign Application Priority Data

Nov. 14, 2023 (CN) .......................... 202311510538.2

(51) Int. Cl.
*G01K 3/08* (2006.01)
*G01K 7/16* (2006.01)

(52) U.S. Cl.
CPC .................. *G01K 3/08* (2013.01); *G01K 7/16* (2013.01); *G01K 2219/00* (2013.01)

(58) Field of Classification Search
CPC ......... G01K 3/08; G01K 7/16; G01K 2219/00
See application file for complete search history.

(56) References Cited

U.S. PATENT DOCUMENTS

| 4,528,499 A | * | 7/1985 | Traub | ................. G01R 17/10 324/706 |
| 6,741,641 B1 | * | 5/2004 | Ballantyne | .............. H04L 1/205 370/252 |

(Continued)

FOREIGN PATENT DOCUMENTS

| CN | 105910726 A | 8/2016 |
| CN | 108931315 A | 12/2018 |

OTHER PUBLICATIONS

Huang Ruiqi, Research on High Precision Measurement Technology of Temperature Sensitive Platinum Resistance in Changing Temperature Environment of Satellite, Dissertation for the Master Degree in Engineering, Harbin Institute of Technology, 2019, pp. 1-68.

(Continued)

*Primary Examiner* — Nathaniel T Woodward
*Assistant Examiner* — Philip L Cotey
(74) *Attorney, Agent, or Firm* — Bayramoglu Law Offices LLC

(57) ABSTRACT

A differential proportional temperature measurement circuit and method based on bidirectional constant voltage drive is proposed. The circuit and method applied to the precision temperature measurement of spacecraft, the main components include a bidirectional constant voltage source proportional bridge circuit, a differential and single-ended amplifier circuit, an analog-to-digital conversion circuit, a digital filter circuit, a data processing circuit and an isolated filter power supply circuit. The method adopts the bidirectional constant voltage drive technology, and enlarges and measures the difference between the voltage values of the reference resistor and the resistance to be measured by improving the sensing bridge of the ordinary commutation proportional method, and suppresses the long-term drift of the excitation unit and the voltage measurement unit. The (Continued)

method can meet the requirements of temperature measurement resolution of μK magnitude and the power spectral density of $μK/Hz^{1/2}$ (0.1 mHz-1 Hz) magnitude in aerospace temperature measurement systems.

20 Claims, 2 Drawing Sheets

(56) References Cited

U.S. PATENT DOCUMENTS

| | | | | |
|---|---|---|---|---|
| 7,301,352 B1* | 11/2007 | Sarma | ............... | G01D 3/032 |
| | | | | 324/691 |
| 8,092,084 B2* | 1/2012 | Riddle | ............... | G01K 7/24 |
| | | | | 374/173 |
| 10,082,598 B2* | 9/2018 | Jernigan | ............... | G01N 19/10 |
| 11,199,465 B2* | 12/2021 | Crickmore | ............... | G01M 3/002 |
| 2004/0227507 A1* | 11/2004 | Swart | ............... | G01L 1/14 |
| | | | | 324/207.18 |
| 2008/0114555 A1* | 5/2008 | Scott | ............... | G01K 15/00 |
| | | | | 374/E11.003 |
| 2010/0020842 A1* | 1/2010 | Riddle | ............... | G01K 7/24 |
| | | | | 374/E19.001 |
| 2011/0184675 A1* | 7/2011 | White | ............... | G01R 15/146 |
| | | | | 702/64 |
| 2013/0130734 A1* | 5/2013 | Rice | ............... | G01M 5/0066 |
| | | | | 73/497 |
| 2017/0045410 A1* | 2/2017 | Crickmore | ............... | G01K 11/32 |
| 2017/0310254 A1* | 10/2017 | Cai | ............... | H02P 6/26 |
| 2022/0140702 A1* | 5/2022 | Lech | ............... | H02K 11/24 |
| | | | | 318/445 |

OTHER PUBLICATIONS

Zhang Pei, Research on System of Platinum Resistance Precision Temperature Measurement Based on Bi-directional Constant Current Source and Reference Resistor, Dissertation for the Master Degree in Engineering, Harbin Institute of Technology, 2009, pp. 1-68.

* cited by examiner

DIFFERENTIAL PROPORTIONAL TEMPERATURE MEASUREMENT CIRCUIT AND METHOD BASED ON BIDIRECTIONAL CONSTANT VOLTAGE DRIVE

CROSS REFERENCE TO THE RELATED APPLICATIONS

This application is based upon and claims priority to Chinese Patent Application No. 202311510538.2, filed on Nov. 14, 2023, the entire contents of which are incorporated herein by reference.

TECHNICAL FIELD

The present invention belongs to the field of aerospace technology, especially relates to a differential proportional temperature measurement circuit and method based on a bidirectional constant voltage drive used in precision temperature measurement of spacecraft.

BACKGROUND

High-precision spacecraft core temperature measurement is a premise to achieve accurate and stable control of the internal temperature of the spacecraft and ensure the stability of the state and performance of the satellite. Especially in the space gravitational wave detection mission, the high precision laser interferometry measurement system and the inertial measurement sensor have very high requirements for environmental stability, and temperature stability has an important influence on its performance, in order to ensure that the space gravitational wave satellite detector can detect the gravitational wave signal with the frequency from 0.1 mHz to 1 Hz, the temperature noise spectral density of the satellite optical platform should be less than 0.1 mK/Hz$^{1/2}$, and the temperature noise spectral density of the inertial sensing system should be less than 5 μK/Hz$^{1/2}$, and then the temperature measurement system should have the temperature measurement resolution of μK magnitude and the power spectral density of μK/Hz$^{1/2}$ magnitude.

Temperature measurement methods are mainly divided into non-contact temperature measurement methods and contact temperature measurement methods. The non-contact temperature measurement methods include radiation thermometry and so on. The working principle of radiation temperature is mainly based on Kirchhoff law, Planck law, Wien's displacement formula and Stephen-Boltzmann law, the use of radiation temperature measurement can be made into full radiation thermometer, infrared thermometer and colorimetric thermometer. Radiation thermometry is easily affected by wavelength, observation angle and so on, so the accuracy is not high. Contact temperature measurement includes the expansion temperature measurement method, optical fiber sensor temperature measurement method, temperature measurement method based on optical whispering-gallery mode micro-ring resonator, electric temperature measurement method, etc, wherein the expansion temperature measurement method measures the temperature by using the thermal expansion of liquid and gas or the change of vapor pressure of the material, the method has low accuracy and is not suitable for applications with high accuracy requirements. The optical fiber sensor temperature measurement method and the temperature measurement method based on the optical whispering-gallery mode micro-ring resonator have high requirements for environmental stability, there is a lack of relevant research on the long-term stability and space environment adaptability of the two methods, and there is no application in satellites; the thermocouple temperature measurement method is easily disturbed by too many factors, and the stability is poor; the thermal resistance temperature measurement method has good accuracy as well as stability, and has been widely used for temperature measurement in satellite.

Nowadays, the conventional thermal resistance temperature measurement method, in accordance with the principle of different measurement structures, the current high-precision resistance temperature measurement method can be divided into Wheatstone bridge method, DC current comparator electric bridge and commutation proportion method. Wherein, the DC current comparator electric bridge method has high measurement accuracy, but the measurement time is too long (10-30 s) to meet the measurement frequency requirements of satellite platforms such as gravitational wave detection.

In the thermal resistance temperature measurement method, the Wheatstone bridge method forms a bridge through the thermal resistance and the reference resistance, and then reflects the resistance change of the thermistor by measuring the voltage, the patent 201811172499.9 is a temperature measurement circuit based on NTC thermistor, in the method, the variable reference voltage and current limiting resistance are used in order to ensure that the measurement has high measurement accuracy in a large temperature range, but this method cannot suppress the long-term drift of the voltage excitation unit, the change of the wire resistance, and the low-frequency noise introduced by the long-term drift of the voltage amplification unit and the voltage measurement unit, and the measurement accuracy is difficult to improve on the mK magnitude, although the patent (201610495133. X) proposes a hardware nonlinear compensation method, it still cannot suppress the above drift and cannot meet the requirements of satellite detection such as gravitational waves.

The commutation proportional method, it can eliminate the influence of wire resistance, constant current source accuracy and long-term stability on temperature measurement by commutation of a constant current source or constant voltage source, this method was adopted by Pei ZHANG of Harbin Institute of Technology in his academic thesis *Research on platinum resistance precision temperature measurement system based on bidirectional constant current source and resistance reference* and Rui-Qi HUANG in his paper *Research on high-precision measurement technology of temperature-sensitive platinum resistance in satellite variable temperature environment*. In patent 201710175753. X, an error correction method in platinum resistance temperature measurement system, on the basis of the above method, the measurement error caused by the mismatch of gain resistance and lead resistance in the amplifier circuit is analyzed, and the temperature measurement accuracy is improved by correction function and common mode rejection ratio calibration. However, the temperature measurement resolution of the above method is up to 0.1 mK magnitude, which is far from μK magnitude, and the long-term drift of the measurement circuit cannot be reduced, the power spectral density of μK/Hz$^{1/2}$ magnitude cannot be obtained.

In summary, in the Wheatstone bridge method, the low-frequency noise such as the long-term drift of the operational amplifier and the long-term drift of the A/D limits the temperature measurement resolution in the low-frequency range and is difficult to further improve.

In the commutation proportional method, the low-frequency noise introduced by the long-term drift of the excitation source and the voltage measurement unit can be suppressed by the commutation and proportional method, but this method directly measures the voltage U at both ends of the resistor, when the temperature changes $\Delta T$, the change of measured voltage is $U+\Delta U$, it is difficult to effectively amplify and identify for the relatively small voltage change $\Delta U$, which makes it difficult to improve the temperature measurement resolution. Therefore, it is necessary to design a high-precision thermal resistance temperature measurement circuit and method to improve the temperature measurement resolution and reduce the noise spectral density.

SUMMARY

An objective of the present invention is to solve the problems in the existing technology, a differential proportional temperature measurement circuit and method based on bidirectional constant voltage drive is proposed to meet the requirements of satellite platforms such as gravitational wave detection devices for temperature measurement systems up to the temperature measurement resolution of $\mu K$ magnitude and the power spectral density of $\mu K/Hz^{1/2}$ (0.1 mHz-1 Hz) magnitude.

The present invention is realized by the following technical scheme, the present invention proposes a differential proportional temperature measurement circuit based on a bidirectional constant voltage drive, the circuit includes a bidirectional constant voltage source proportional bridge circuit, a differential and single-ended amplifier circuit, an analog-to-digital conversion circuit, a digital filter circuit, a data processing circuit and an isolated filter power supply circuit;

the bidirectional constant voltage source proportional bridge circuit, differential and single-ended amplifier circuit, analog-to-digital conversion circuit, digital filter circuit and data processing circuit are connected in turn; the isolated filter power supply circuit provides power for the bidirectional constant voltage source proportional bridge circuit, differential and single-ended amplifier circuit, analog-to-digital conversion circuit, digital filtering circuit and data processing circuit.

Further, the bidirectional constant voltage source proportional bridge circuit includes a constant voltage source $V_1$, an analog switch $SW_1$, a current limiting resistor $R_L$, a reference resistor $R_{ref}$ and a measurement resistor $R_T$; a positive electrode of the constant voltage source $V_1$ is connected to input terminals A and D of the analog switch $SW_1$, and a negative electrode of $V_1$ is connected to input terminals B and C of the analog switch $SW_1$; a selection control terminal S of the analog switch $SW_1$ is connected to an output port of a main control chip in the data processing circuit through an isolated $I/O_1$, and is controlled by the main control chip, output terminals $O_1$ and $O_2$ of the analog switch $SW_1$ are connected to series circuits of the current limiting resistor $R_L$, the reference resistor $R_{ref}$ and the measurement resistor $R_T$; two terminals of $R_{ref}$ and $R_T$ are connected to the differential and single-ended amplifier circuit to output a voltage signal.

Further, the differential and single-ended amplifier circuit includes three differential amplifiers $A_1$, $A_2$ and $A_3$, an input terminal of the differential amplifier $A_1$ is connected to two terminals of the $R_T$, an input terminal of the differential amplifier $A_2$ is connected to two terminals of the $R_{ref}$ and output terminals of the $A_1$ and $A_2$ are connected to an input terminal of the $A_3$; an inverting input terminal and an inverting output terminal of the differential amplifier $A_3$ are connected to an analog-to-digital conversion circuit.

Further, the analog-to-digital conversion circuit includes a filter resistor $R_f$, a filter capacitor $C_f$, and a multi-channel analog-to-digital converter (ADC); an end of the filter resistor $R_f$ is connected to an output terminal of $A_3$, and another end of the filter resistor $R_f$ is connected to the filter capacitor $C_f$ and a 1 channel of the ADC; another end of the $C_f$ is connected to a 2 channel of the multi-channel ADC; the ADC converts an amplified analog voltage signal into a digital signal and is connected to the digital filter circuit.

Further, the digital filter circuit includes an adjustable sinc filter and a 32-order finite impulse response (FIR) filter; a digital signal output by the ADC is first filtered by the sinc filter, and then sent to the data processing circuit after entering the 32-order FIR filter and performing a second stage filtering.

Further, the data processing circuit includes an isolated $I/O_1$, an isolated $I/O_2$ and a main control chip; an output port of the main control chip is connected to the isolated $I/O_1$, and then connected to the selection control terminal S of the analog switch $SW_1$ to realize a switching of an voltage direction; an input port of the main control chip is connected to the isolated $I/O_2$, and then connected to an output port of the 32-order FIR filter to receive data output by the digital filter circuit, and transmit voltage information to a host computer through a serial port.

Further, the isolated filter power supply circuit includes an analog power supply I, an analog power supply II and a digital power supply; the analog power supply I supplies power for the bidirectional constant voltage source proportional bridge circuit; the analog power supply II supplies power for differential and single-ended amplifier circuit, analog-to-digital conversion circuit and digital filter circuit; the digital power supply supplies power for the data processing circuit.

The present invention proposes a measurement method for a differential proportional temperature measurement circuit based on a bidirectional constant voltage drive, the method includes the following steps:

(1) in a first step, an output pin of the main control chip is connected to the selection control terminal S of the analog switch $SW_1$ through isolated $I/O_1$, firstly, an A terminal and an $O_1$ terminal, a C terminal and an O2 terminal are connected, at this time, an voltage excitation direction of $V_1$ applied to $R_{ref}$ and $R_T$ is positive, assuming that an voltage conversion sensitivity error of the bidirectional constant voltage source proportional bridge circuit is recorded as $\alpha_1$, and recording current flowing through the measurement resistor $R_T$ and the reference resistor $R_{ref}$ as $I_+$, amplifying voltages $(1+\alpha_1) I_+ R_T$ and $(1+\alpha_1) I_+ R_{ref}$ at both ends of $R_{ref}$ and $R_T$ by three differential amplifiers $A_1$, $A_2$ and $A_3$, recording magnifications of differential amplifiers $A_1$, $A_2$ and $A_3$ as $G_1$, $G_2$ and $G_3$, where $G_1=G_2$, $E_{\theta 1}$ is a thermal potential of the wire, and an offset voltage error of the differential amplifier is $\Delta U_1^*$; an output voltage signal $\Delta U_+ = (1+\alpha_1) [I_+(R_T-R_{ref})+E_{\theta 1}-E_{\theta 1}]G_2G_3+\Delta U_1^*$ of the differential amplifier $A_3$ is a difference value between the voltages at both ends of $R_{ref}$ and $R_T$, and an output voltage signal $U_{ref+}=(1+\alpha_1)(I_+(R_{ref}+E_{\theta 1})G_2+\Delta U_1^*$ of the differential amplifier $A_2$ is the voltages at both ends of $R_{ref}$, entering $\Delta U_+$ and $U_{ref+}$ into the ADC after filtering out high-frequency noise by low-pass filtering, and performing an analog-to-digital conversion, then filtering the low-frequency noise by sinc filter and 32-order FIR filter, assuming $\Delta U_1$ and $\Delta U_2$ as errors caused by a zero drift of 1 channel and 2 channel of ADC, respectively, finally, obtaining values of $\Delta U_+$ and $U_{ref+}$ and sending to the main control chip for storage by isolated I/O$_2$, where:

$$\Delta U_+ = (1+\alpha_1)[I_+(R_T-R_{ref})+E_{\theta 1}-E_{\theta 1}]G_2G_3+\Delta U_1^*+\Delta U_1$$

$$U_{ref+}=(1+\alpha_1)I_+(R_{ref}+E_{\theta 1})G_2+\Delta U_1^*+\Delta U_2$$

(2) in a second step, controlling the analog switch SW$_1$ by an output pin of the main control chip passes through the isolated I/O$_1$, and connecting a B end and an O$_1$ end, a D end and an O$_2$ end, at this time, an voltage excitation direction applied by V$_2$ to R$_{ref}$ and R$_T$ is negative, subjecting voltages at both ends of R$_{ref}$ and R$_T$ to a same differential amplification as the first step, after the process of low-pass filtering, A/D conversion, sinc filter, and 32-order FIR filter, obtaining voltage values $\Delta U_-$ and $U_{ref-}$, sending to the main control chip for storage through the isolated I/O$_2$; when the voltage excitation direction is negative, recording the voltage conversion sensitivity error of the bidirectional constant voltage source proportional bridge circuit as $\alpha_2$, recording current flowing through the measurement resistor R$_T$ and the reference resistor R$_{ref}$ as $I_-$, and the magnifications of the differential amplifiers A$_1$, A$_2$ and A$_3$ are unchanged, recording as G$_1$, G$_2$ and G$_3$, where G$_1$=G$_2$, E$_{\theta 2}$ is a thermal potential of the wire, and an offset voltage error of the differential amplifier is $\Delta U_2^*$, assuming $\Delta U_3$ and $\Delta U_4$ be the error caused by the zero drift of the two channels of the ADC respectively, then:

$$\Delta U_- = (1+\alpha_2)[I_-(R_T-R_{ref})+E_{\theta 2}-E_{\theta 2}]G_2G_3+\Delta U_2^*+\Delta U_3$$

$$U_{ref-}=(1+\alpha_2)I_-(R_{ref}+E_{\theta 2})G_2+\Delta U_1^*+\Delta U_4$$

(3) in a third step, calculating and obtaining R$_T$ resistance of the resistance to be measured in the main control chip by a circuit voltage division theorem:

$$R_T = R_{ref} + R_{ref}\frac{\Delta U_+ - \Delta U_-}{(U_{ref+} - U_{ref-})G_3}.$$

The present invention proposes an electronic device, including memory and a processor, the memory stores a computer program, and the processor executes the computer program to realize steps of a measurement method for a differential proportional temperature measurement circuit based on bidirectional constant voltage drive.

The present invention proposes a computer readable storage medium, the computer readable storage medium is used for storing computer instructions, and steps of a measurement method for differential proportional temperature measurement circuit based on bidirectional constant voltage drive are realized when the computer instructions are executed by the processor.

Compared with the existing technology, the beneficial effect of the present invention is:

1. the present invention eliminates the low-frequency drift and noise higher than 1 Hz frequency caused by factors such as thermoelectric potential, offset voltage of differential amplifier, zero drift of ADC, etc. in the measurement circuit from the principle of the measurement method;

2. the present invention only amplifies and A/D converts the voltage change $\Delta U$ when the temperature changes slightly $\Delta T$, and further improves the measurement resolution on the basis of ensuring the long-term stability of the system.

BRIEF DESCRIPTION OF THE DRAWINGS

To explain the embodiments of the present invention or the technical solutions in the prior art more clearly, a brief introduction will be made to the accompanying drawings used in the embodiments or the description of the prior art. It is obvious that the drawings in the description below are only some embodiments of the present invention, and those ordinarily skilled in the art can obtain other drawings according to these drawings without creative work.

DETAILED DESCRIPTION OF THE EMBODIMENTS

The following clearly and completely describes the technical solutions in embodiments of the present invention with reference to the drawings of embodiments of the present invention. Apparently, the described embodiments are only some but not all of the embodiments of the present invention. All other embodiments obtained by those of ordinary skill in the art based on the embodiments of the present invention without involving any creative effort shall fall within the scope of protection of the present invention.

Figure 1:
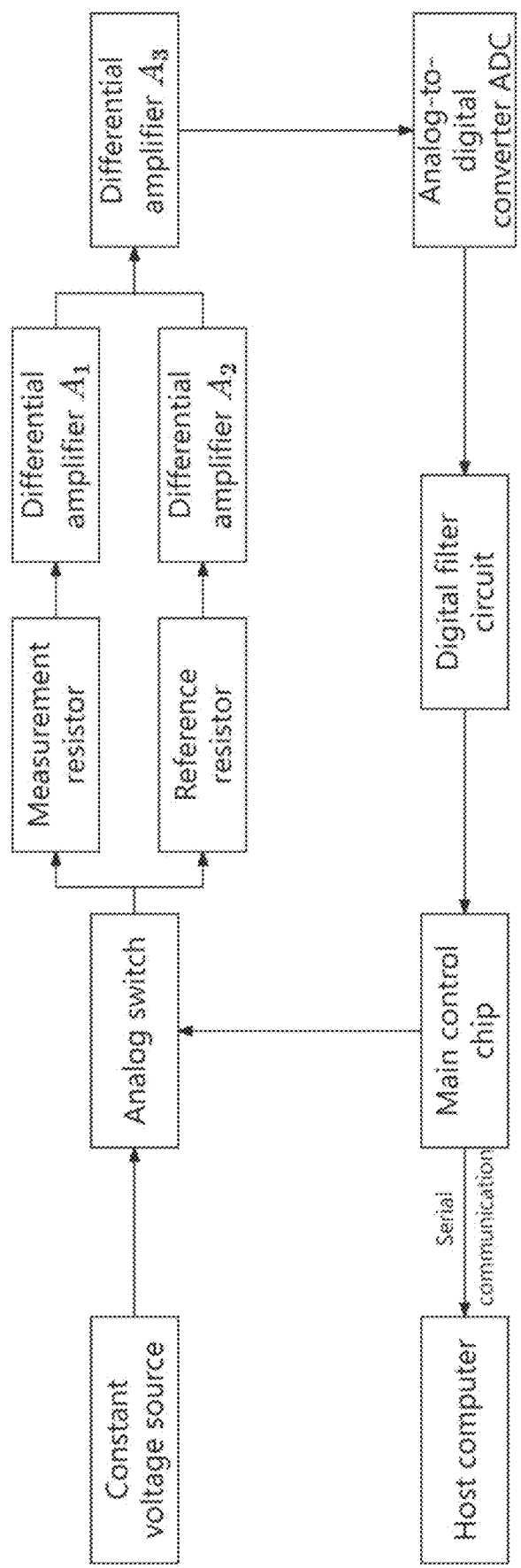
FIG. 1 is a structure diagram of a temperature measurement system of an embodiment of the present invention.

The present invention proposes a differential proportional temperature measurement circuit and method based on bidirectional constant voltage drive, the structure diagram of the temperature measurement system is shown in FIG. 1, the constant voltage source provides constant voltage excitation for measurement resistor and reference resistor; the analog switch is controlled by the main control chip to switch the voltage excitation direction; the measurement resistor converts the temperature signal into a resistance signal and then into a voltage signal; the differential amplifier A$_1$ amplifies the voltage at both ends of the measurement resistor, the differential amplifier A$_2$ amplifies the voltage at both ends of the reference resistor, and the differential amplifier A3 amplifies the difference between the voltage at both ends of the measurement resistor and the reference resistor; the ADC converts the amplified analog voltage signal into a digital signal and sends it to the digital filter circuit; the digital filter circuit receives the digital signal sent by the analog-to-digital conversion circuit, filters the digital signal and sends it to the main control chip, the main control chip transmits the voltage information to the host computer through the serial port, finally, the resistance value of the measurement resistor is calculated by each measured voltage value.

Figure 2:
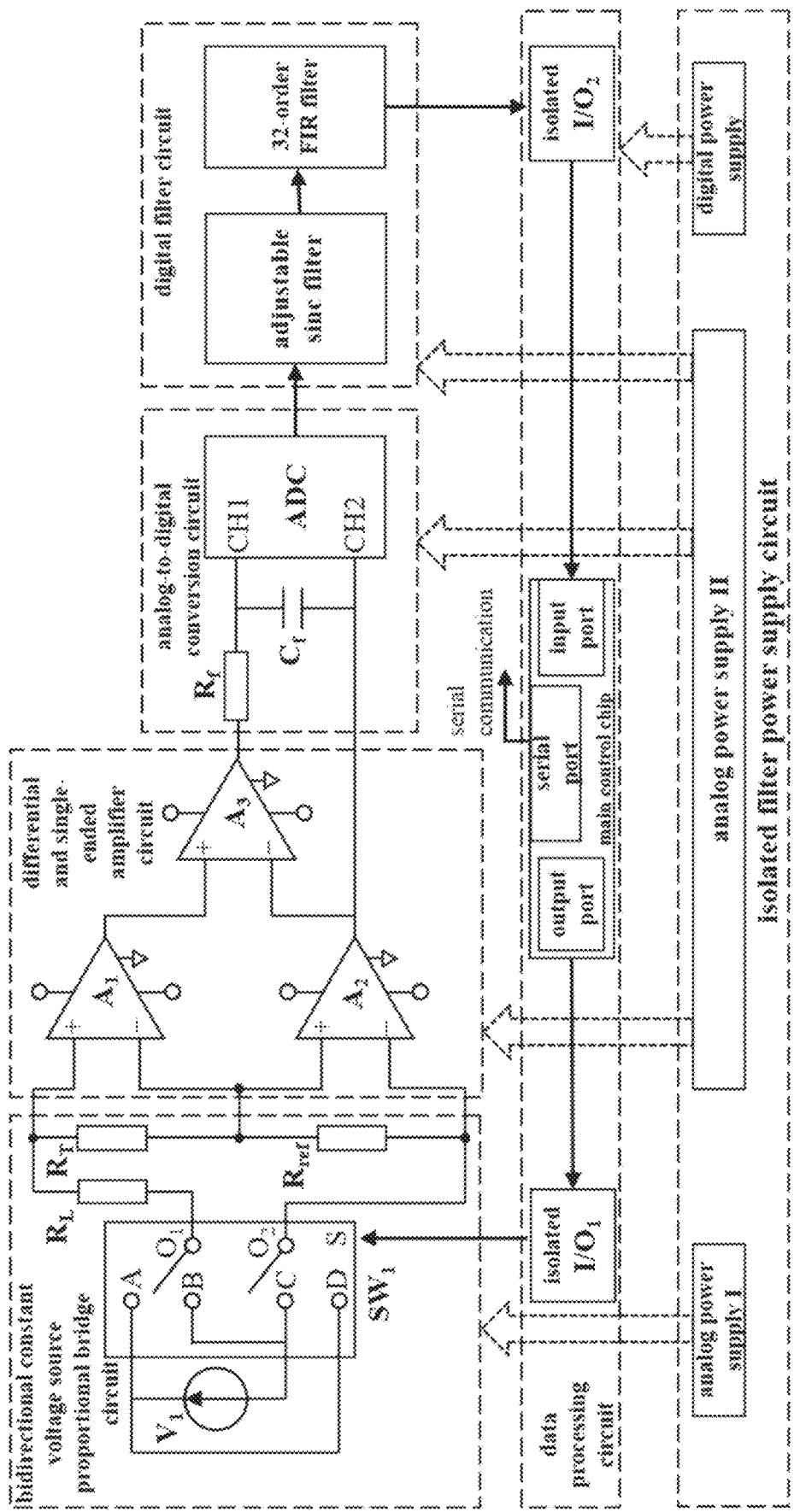
FIG. 2 is a schematic diagram of a temperature measurement circuit of an embodiment of the present invention.

A differential proportional temperature measurement circuit based on a bidirectional constant voltage drive proposed by the present invention, the schematic diagram is shown in FIG. 2, the system circuit includes a bidirectional constant voltage source proportional bridge circuit, a differential and single-ended amplifier circuit, an analog-to-digital conversion circuit, a digital filter circuit, a data processing circuit and an isolated filter power supply circuit.

The bidirectional constant voltage source proportional bridge circuit includes a constant voltage source V$_1$, an analog switch SW$_1$, a current limiting resistor R$_L$, a reference resistor R$_{ref}$ and a measurement resistor R$_T$; the constant voltage source V$_1$ provides constant voltage excitation for R$_T$ and R$_{ref}$, a positive electrode of the constant voltage source V$_1$ is connected to input terminals A and D of the analog switch SW$_1$, and a negative electrode is connected to input terminals B and C of the analog switch SW$_1$;

a selection control terminal S of the analog switch $SW_1$ is connected to an output port of a main control chip, and the connection between the output terminal and the input terminal is controlled by the main control chip; two terminals of $R_{ref}$ and $R_T$ are connected to the differential and single-ended amplifier circuit to output an voltage signal.

The differential and single-ended amplifier circuit includes three differential amplifiers $A_1$, $A_2$ and $A_3$, an input terminal of the differential amplifier $A_1$ is connected to two terminals of the $R_T$, an input terminal of the differential amplifier $A_2$ is connected to two terminals of the $R_{ref}$, and output terminals of the $A_1$ and $A_2$ are connected to an input terminal of the $A_3$; an inverting input terminal and an inverting output terminal of the differential amplifier $A_3$ are connected to an analog-to-digital conversion circuit. Differential and single-ended amplifier circuits have an important impact on the overall performance of the system, in order to make the measurement results have smaller noise spectral density and greater resolution, the voltage difference AU between $R_{ref}$ and $R_T$ and the voltage $U_{ref}$ at both ends of $R_{ref}$ are as close as possible to the full-scale input voltage of the ADC by adjusting the magnification of the differential amplifiers $A_1$, $A_2$ and $A_3$.

The analog-to-digital conversion circuit includes a filter resistor $R_f$, a filter capacitor $C_f$, and a multi-channel ADC; an end of the filter resistor $R_f$ is connected to an output terminal of $A_3$, and another end of the filter resistor $R_f$ is connected to the filter capacitor $C_f$ and a 1 channel of the ADC; another end of the $C_f$ is connected to 2 channel of the multi-channel ADC, $R_f$ and $C_f$ constitute a first-order RC low-pass filter; the multi-channel ADC converts the amplified analog voltage signal into a digital signal through its internal 4-order Σ-Δ modulator and outputs it to the digital filter circuit.

The digital filter circuit includes an adjustable sinc filter and a 32-order FIR filter; a digital signal output by the ADC is first filtered by the sine filter, and then sent to the data processing circuit after entering the 32-order FIR filter and performing a second stage filtering.

The data processing circuit includes an isolated $I/O_1$, an isolated $I/O_2$ and a main control chip; The use of isolated I/O between the digital circuit and the analog circuit can effectively suppress the noise under the premise of ensure that the transmitted signal can pass through without resistance; an output port of the main control chip is connected to the isolated $I/O_1$, and then connected to the selection control terminal S of the analog switch $SW_1$ to realize a switching of a voltage direction; an input port of the main control chip is connected to the isolated $I/O_2$, and then connected to an output port of the 32-order FIR filter to receive data output by the digital filter circuit, and transmit voltage information to a host computer through a serial port.

The isolated filter power supply circuit includes an analog power supply I, an analog power supply II and a digital power supply; it is mainly concerned the power consumption performance of the power supply for the digital circuit part of the measurement circuit, and the high-precision module which is extremely sensitive to noise in the analog circuit part puts forward higher requirements for the stability and accuracy of the power supply, therefore, in order to effectively suppress the influence of signal noise in the digital circuit on the precise and weak signals in the analog circuit, the isolated power supply design is adopted between the circuits; the analog power supply I supplies power for the bidirectional constant voltage source proportional bridge circuit; the analog power supply II supplies power for differential and single-ended amplifier circuit, analog-to-digital conversion circuit and digital filter circuit; the digital power supply supplies power for the data processing circuit.

The present invention proposes a differential proportional temperature measurement method based on a bidirectional constant voltage drive, the specific principle of the method is as follows:

(1) in a first step, an output pin of the main control chip is connected to the selection control terminal S of the analog switch $SW_1$ through isolated $I/O_1$, firstly, an A terminal and an $O_1$ terminal, a C terminal and an O2 terminal are connected, at this time, a voltage excitation direction of $V_1$ applied to $R_{ref}$ and $R_T$ is positive, assumed that a voltage conversion sensitivity error of the bidirectional constant voltage source proportional bridge circuit is recorded as $\alpha_1$, and current flowing through the measurement resistor $R_T$ and the reference resistor $R_{re}$ is recorded as $I_+$, voltages $(1+\alpha_1) I_+ R_T$ and $(1+\alpha_1) I_+ R_{ref}$ at both ends of $R_{ref}$ and $R_T$ are amplified by three differential amplifiers $A_1$, $A_2$ and $A_3$. The differential and single-ended amplifier circuits have an important influence on the overall performance of the system, in order to make the measurement results have smaller noise spectral density and greater resolution, by adjusting the amplification gain of the differential amplifier $A_1$, $A_2$ and $A_3$, the voltage difference AU between $R_{ref}$ and $R_T$ and the voltage $U_{ref}$ at both ends of $R_{ref}$ are as close as possible to the full-scale input voltage of the ADC.

Magnifications of differential amplifiers $A_1$, $A_2$ and $A_3$ are recorded as $G_1$, $G_2$ and $G_3$, where $G_1=G_2$, $E_{\theta 1}$ is a thermal potential of the wire, and an offset voltage error of the differential amplifier is $\Delta U_1^*$; an output voltage signal $\Delta U_+ = (1+\alpha_1) [I_+(R_T-R_{ref})+E_{\theta 1}-E_{\theta 1}]G_2G_3+\Delta U_1^*$ of the differential amplifier $A_3$ is a difference between the voltages at both ends of $R_{ref}$ and $R_T$, and an output voltage signal $U_{ref+}=(1+\alpha_1) (I_+R_{ref}+E_{\theta 1})G_2+\Delta U_1^*$ of the differential amplifier $A_2$ is the voltages at both ends of $R_{ref}$, $\Delta U_+$ and $U_{ref+}$ enter into the ADC after filtering out high-frequency noise by low-pass filtering, and an analog-to-digital conversion is performed, then the low-frequency noise caused by the gain drift of differential amplifier and the quantization error of ADC is filtered by sinc filter and 32-order FIR filter, assumed $\Delta U_1$ and $\Delta U_2$ as errors caused by a zero drift of 1 channel and 2 channel of ADC, respectively, finally, values of $\Delta U_+$ and $U_{ref+}$ are obtained and sent to the main control chip for storage by isolated $I/O_2$, where:

$$\Delta U_+ = (1+\alpha_1)[I_+(R_T-R_{ref})+E_{\theta 1}-E_{\theta 1}]G_2G_3+\Delta U_1^*+\Delta U_1$$

$$U_{ref+}=(1+\alpha_1)I_+(R_{ref}+E_{\theta 1})G_2+\Delta U_1^*+\Delta U_2$$

(2) in a second step, the analog switch $SW_1$ is controlled by an output pin of the main control chip passes through the isolated $I/O_1$, and is connected a B end and an $O_1$ end, a D end and an $O_2$ end, at this time, an voltage excitation direction applied by $V_1$ to $R_{ref}$ and $R_T$ is negative, voltages at both ends of $R_{ref}$ and $R_T$ are subjected to a same differential amplification as the first step, after the process of low-pass filtering, A/D conversion, sinc filter, and 32-order FIR filter, voltage values $\Delta U_-$ and $U_{ref-}$ are obtained, and sent to the main control chip for storage through the isolated $I/O_2$. When the voltage excitation direction is negative, the voltage conversion sensitivity error of the bidirectional constant voltage source proportional bridge circuit is recorded as $\alpha_2$, current flowing through the measurement resistor $R_T$ and the reference resistor $R_{ref}$ is recorded as $I_-$, and the magnifications of the differential amplifiers $A_1$, $A_2$ and $A_3$ are unchanged, recorded as $G_1$, $G_2$ and $G_3$, where $G_1=G_2$, $E_{\theta 2}$ is a thermal potential of the wire, and an offset voltage error of the differential amplifier is $\Delta U_2^*$, assumed $\Delta U_3$ and $\Delta U_4$ be the error caused by the zero drift of the two channels of the ADC respectively, then:

$$\Delta_{U^-}=(1+\alpha_2)[I_-(R_T-R_{ref})+E_{\theta 2}-E_{\theta 2}]G_2G_3+\Delta U_2^*+\Delta U_3$$

$$U_{ref-}=(1+\alpha_2)I_-(R_{ref}+E_{\theta 2})G_2+\Delta U_1^*+\Delta U_4$$

(3) in a third step, $R_T$ resistance of the resistance to be measured in the main control chip is calculated and obtained by a circuit voltage division theorem:

$$R_T = R_{ref} + R_{ref} \frac{\Delta U_+ - \Delta U_-}{(U_{ref+} - U_{ref-})G_3}.$$

The analog switch $SW_1$ is controlled by the main control chip, the frequency of switching the voltage excitation direction is greater than 100 Hz, and the time of completing an $R_T$ measurement is less than 10 ms, therefore, it can be considered that $\alpha_1=\alpha_2$, $I_-=I_+$, $E_{\theta 1}=E_{\theta 2}$, $\Delta U_1^*=\Delta U_2^*$, $\Delta U_1=\Delta U_3$, $\Delta U_2=\Delta U_4$, that is, the low-frequency drift and noise higher than 1 Hz due to the thermal electromotive force, a long time drift of the constant voltage source $V_1$, the differential amplifier offset voltage $\Delta U_1^*$, $\Delta U_2^*$, zero drift $\Delta U_1$, $\Delta U_2$, $\Delta U_3$, $\Delta U_4$ of ADC and other factors are eliminated by the process of $\Delta U_+-\Delta U_-$ and $U_{ref+}-U_{ref-}$ in the method proposed by the present invention.

The present invention proposes an electronic device, including memory and a processor, the memory stores a computer program, and the processor executes the computer program to realize steps of a measurement method for a differential proportional temperature measurement circuit based on bidirectional constant voltage drive.

The present invention proposes a computer readable storage medium, the computer readable storage medium is used for storing computer instructions, and steps of a measurement method for differential proportional temperature measurement circuit based on bidirectional constant voltage drive are realized when the computer instructions are executed by the processor.

The memory in this application can be volatile memory or non-volatile memory, or can include both volatile and non-volatile memory. Wherein non-volatile memory can be read only memory (ROM), programmable ROM (PROM), erasable PROM (EPROM), electrically EPROM (EEPROM) or flash memory. The volatile memory can be a random access memory (RAM), which is used as an external cache. Through illustrative but not restrictive descriptions, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct ram bus RAM (DR RAM). It should be noted that the memory of the method described in the present invention is intended to include, but is not limited to, these and any other suitable types of memory.

In the above embodiment, it can be achieved in whole or in part by software, hardware, firmware or any combination thereof. When implemented by using software, it can be implemented in the form of computer program products in whole or in part. The computer program product includes one or more computer instructions. When loading and executing the computer instructions on the computer, the processes or functions described in this application embodiment are produced in whole or in part. The computer can be a general computer, a special computer, a computer network, or other programmable device. The computer instructions can be stored in a computer readable storage medium, or transmitted from one computer readable storage medium to another computer readable storage medium, for example, the computer instructions can be transmitted from a website site, computer, server or data center to another website site, computer, server or data center through wired (such as coaxial cable, optical fiber, digital subscriber line (DSL)) or wireless (such as infrared, wireless, microwave, etc.). The computer readable storage medium can be any available medium that the computer can access or a data storage device including a server, data center and so on integrated with one or more available media. The available medium can be magnetic media (e.g., floppy disk, hard disk, tape), optical media (e.g., high-density digital video disc (DVD)), or semiconductor media (e.g., solid state disc (SSD)).

In the implementation process, each step of the above method can be completed by the integrated logic circuit of the hardware in the processor or the instruction in the form of software. The steps of the method disclosed in this application embodiment can be directly reflected in the completion of the hardware processor, or the combination of hardware and software modules in the processor. Software modules can be located in random access memory, flash memory, read only memory, programmable read only memory or electrically erasable programmable memory, registers and other mature storage media in this field. The storage medium is located in the memory, and the processor reads the information in the memory, and completes the steps of the above method in combination with its hardware. To avoid repetition, this is no longer described in detail.

It should be noted that the processor in this application embodiment can be an integrated circuit chip with signal processing capability. In the implementation process, the steps of the above method embodiment can be completed by the integrated logic circuit of the hardware in the processor or the instruction in the form of software. The above processors can be general-purpose processors, digital signal processors (DSP), application specific integrated circuits (ASIC), field programmable gate array (FPGA) or other programmable logic devices, discrete gate or transistor logic devices, discrete hardware components. The methods, steps and logic diagrams disclosed in the application embodiment can be realized or executed. A general-purpose processor can be a microprocessor or the processor can also be any conventional processor. The steps of the method disclosed in this application embodiment can be directly reflected in the completion of the hardware decoding processor, or the combination of hardware and software modules in the decoding processor. Software modules can be located in random access memory, flash memory, read only memory, programmable read only memory or electrically erasable programmable memory, registers and other mature storage media in this field. The storage medium is located in the memory, and the processor reads the information in the memory, and completes the steps of the above method in combination with its hardware.

A differential proportional temperature measurement circuit and method based on bidirectional constant voltage drive proposed in the present invention is described in detail above, in this paper, specific embodiments are used to explain the principle and implementation of the present invention, the above embodiments are only used to help understand the method and core idea of the present invention; meanwhile, for the general technical personnel in this field, according to the idea of the present invention, there will be changes in the specific embodiments and application scope. In summary, the content of this specification should not be understood as a limitation to the present invention.

What is claimed is:

1. A measurement method for a differential proportional temperature measurement circuit based on a bidirectional constant voltage drive, wherein the differential proportional temperature measurement circuit comprises a bidirectional constant voltage source proportional bridge circuit, a differential and single-ended amplifier circuit, an analog-to-digital conversion circuit, a digital filter circuit, a data processing circuit, and an isolated filter power supply circuit;

wherein the bidirectional constant voltage source proportional bridge circuit, the differential and single-ended amplifier circuit, the analog-to-digital conversion circuit, the digital filter circuit, and the data processing circuit are connected in turn; the isolated filter power supply circuit provides power for the bidirectional constant voltage source proportional bridge circuit, the differential and single-ended amplifier circuit, the analog-to-digital conversion circuit, the digital filtering circuit, and the data processing circuit;

wherein the measurement method comprises the following steps:

(1) in a first step, connecting an output pin of a main control chip to a selection control terminal S of an analog switch $SW_1$ through an isolated $I/O_1$, firstly, connecting an A terminal and an $O_1$ terminal, a C terminal and an $O_2$ terminal, at this time, an voltage excitation direction applied by a constant voltage source $V_1$ to a reference resistor $R_{ref}$ and a measurement resistor $R_T$ being positive, assuming that a first voltage conversion sensitivity error of the bidirectional constant voltage source proportional bridge circuit is recorded as $\alpha_1$, and recording current flowing through the measurement resistor $R_T$ and the reference resistor $R_{ref}$ as $I_+$, amplifying voltages $(1+\alpha_1) I_+R_T$ and $(1+\alpha_1) I_+R_{ref}$ at both ends of the reference resistor $R_{ref}$ and the measurement resistor $R_T$ by three differential amplifiers $A_1$, $A_2$, and $A_3$, recording magnifications of the three differential amplifiers $A_1$, $A_2$, and $A_3$ as $G_1$, $G_2$, and $G_3$, wherein $G_1=G_2$, $E_{\theta 1}$ is a first thermal potential of a wire, and a first offset voltage error of the differential amplifier is $\Delta U_1^*$; wherein an output voltage signal $\Delta U_+=(1+\alpha_1)[I_+(R_T-R_{ref})+E_{\theta 1}-E_{01}]G_2G_3+\Delta U_1^*$ of the differential amplifier $A_3$ is a difference between voltages at both ends of the reference resistor $R_{ref}$ and the measurement resistor $R_T$, and an output voltage signal $U_{ref+}=(1+\alpha_1)(I_+R_{ref}+E_{01})G_2+\Delta U_1^*$ of the differential amplifier $A_2$ is voltages at both ends of the reference resistor $R_{ref}$, entering the output voltage signal $\Delta U_+$ and the output voltage signal $U_{ref+}$ into an analog-to-digital converter (ADC) after filtering out high-frequency noise by low-pass filtering, and performing an analog-to-digital conversion, then filtering low-frequency noise by a sinc filter and a 32-order finite impulse response (FIR) filter, assuming $\Delta U_1$ and $\Delta U_2$ as errors caused by a zero drift of 1 channel and 2 channel of the ADC, respectively, finally, obtaining values of $\Delta U_+$ and $U_{ref+}$ and sending the values of $\Delta U_+$ and $U_{ref+}$ to the main control chip for storage by an isolated $I/O_2$, wherein:

$$\Delta U_+=(1+\alpha_1)[I_+(R_T-R_{ref})+E_{\theta 1}-E_{01}]G_2G_3+\Delta U_1^*+\Delta U_1$$

$$U_{ref+}=(1+\alpha_1)I_+(R_{ref}+E_{\theta 1})G_2+\Delta U_1^*+\Delta U_2$$

(2) in a second step, passing the output pin of the main control chip through the isolated $I/O_1$ to control the analog switch $SW_1$, and connecting a B end and an $O_1$ end, a D end and an $O_2$ end, at this time, an voltage excitation direction applied by the constant voltage source $V_1$ to the reference resistor $R_{ref}$ and the measurement resistor $R_T$ being negative, subjecting voltages at both ends of the reference resistor $R_{ref}$ and the measurement resistor $R_T$ to a same differential amplification as the first step, after a process of the low-pass filtering, an A/D conversion, the sinc filter, and the 32-order FIR filter, obtaining voltage values $\Delta U_-$ and $U_{ref-}$, sending the voltage values $\Delta U_-$ and $U_{ref-}$ to the main control chip for storage through the isolated $I/O_2$; when the voltage excitation direction is negative, recording a second voltage conversion sensitivity error of the bidirectional constant voltage source proportional bridge circuit as $\alpha_2$, recording current flowing through the measurement resistor $R_T$ and the reference resistor $R_{ref}$ as $I_-$, wherein the magnifications of the three differential amplifiers $A_1$, $A_2$, and $A_3$ are unchanged, recording as $G_1$, $G_2$, and $G_3$, wherein $G_1=G_2$, $E_{\theta 2}$ is a second thermal potential of the wire, and a second offset voltage error of the differential amplifier is $\Delta U_2^*$, assuming $\Delta U_3$ and $\Delta U_4$ be errors caused by the zero drift of the 1 channel and the 2 channel of the ADC respectively, then:

$$\Delta U_-=(1+\alpha_2)[I_-(R_T-R_{ref})+E_{\theta 2}-E_{02}]G_2G_3+\Delta U_2^*+\Delta U_3$$

$$U_{ref-}=(1+\alpha_2)I_-(R_{ref}+E_{\theta 2})G_2+\Delta U_1^*+\Delta U_4; \text{ and}$$

(3) in a third step, calculating and obtaining an $R_T$ resistance of a resistance to be measured in the main control chip by a circuit voltage division theorem:

$$R_T = R_{ref} + R_{ref}\frac{\Delta U_+ - \Delta U_-}{(U_{ref+} - U_{ref-})G_3}.$$

2. The measurement method according to claim 1, wherein the bidirectional constant voltage source proportional bridge circuit comprises the constant voltage source $V_1$, the analog switch $SW_1$, a current limiting resistor $R_L$, the reference resistor $R_{ref}$, and the measurement resistor $R_T$; a positive electrode of the constant voltage source $V_1$ is connected to input terminals A and D of the analog switch $SW_1$, and a negative electrode of the constant voltage source $V_1$ is connected to input terminals B and C of the analog switch $SW_1$; the selection control terminal S of the analog switch $SW_1$ is connected to an output port of the main control chip in the data processing circuit through the isolated $I/O_1$, and is controlled by the main control chip, output terminals $O_1$ and $O_2$ of the analog switch $SW_1$ are connected to a series circuit of the current limiting resistor $R_L$, the reference resistor $R_{ref}$, and the measurement resistor $R_T$; two terminals of the reference resistor $R_{ref}$ and the measurement resistor $R_T$ are connected to the differential and single-ended amplifier circuit to output an voltage signal.

3. The measurement method according to claim 2, wherein the differential and single-ended amplifier circuit comprises the differential amplifier $A_1$, the differential amplifier $A_2$, and the differential amplifier $A_3$, wherein an input terminal of the differential amplifier $A_1$ is connected to two terminals of the measurement resistor $R_T$, an input terminal of the differential amplifier $A_2$ is connected to two terminals of the reference resistor $R_{ref}$, and output terminals of the differential amplifier $A_1$ and the differential amplifier $A_2$ are connected to an input terminal of the differential amplifier $A_3$; an inverting input terminal and an inverting output terminal of the differential amplifier $A_3$ are connected to the analog-to-digital conversion circuit.

4. The measurement method according to claim 3, wherein the analog-to-digital conversion circuit comprises a filter resistor $R_f$, a filter capacitor $C_f$, and a multi-channel ADC; a first end of the filter resistor $R_f$ is connected to an output terminal of the differential amplifier $A_3$, and a second end of the filter resistor $R_f$ is connected to a first end of the filter capacitor $C_f$ and a 1 channel of the multi-channel ADC; a second end of the filter capacitor $C_f$ is connected to a 2 channel of the multi-channel ADC; the multi-channel ADC converts an amplified analog voltage signal into a digital signal and is connected to the digital filter circuit.

5. The measurement method according to claim 4, wherein the digital filter circuit comprises an adjustable sinc filter and the 32-order FIR filter; a digital signal output by the multi-channel ADC is first filtered by the adjustable sinc filter, and then sent to the data processing circuit after entering the 32-order FIR filter and performing a second stage filtering.

6. The measurement method according to claim 5, wherein the data processing circuit comprises the isolated $I/O_1$, the isolated $I/O_2$, and the main control chip; the output port of the main control chip is connected to the isolated $I/O_1$, and then connected to the selection control terminal S of the analog switch $SW_1$ to realize a switching of a voltage direction; an input port of the main control chip is connected to the isolated $I/O_2$, and then connected to an output port of the 32-order FIR filter to receive data output by the digital filter circuit, and transmit voltage information to a host computer through a serial port.

7. The measurement method according to claim 6, wherein the isolated filter power supply circuit comprises an analog power supply I, an analog power supply II, and a digital power supply; the analog power supply I supplies power for the bidirectional constant voltage source proportional bridge circuit; the analog power supply II supplies power for the differential and single-ended amplifier circuit, the analog-to-digital conversion circuit, and the digital filter circuit; the digital power supply supplies power for the data processing circuit.

8. An electronic device, comprising a memory and a processor, wherein the memory stores a computer program, wherein the processor executes the computer program to realize steps of the measurement method according to claim 1.

9. The electronic device according to claim 8, wherein in the measurement method, the bidirectional constant voltage source proportional bridge circuit comprises the constant voltage source $V_1$, the analog switch $SW_1$, a current limiting resistor $R_L$, the reference resistor $R_{ref}$, and the measurement resistor $R_T$; a positive electrode of the constant voltage source $V_1$ is connected to input terminals A and D of the analog switch $SW_1$, and a negative electrode of the constant voltage source $V_1$ is connected to input terminals B and C of the analog switch $SW_1$; the selection control terminal S of the analog switch $SW_1$ is connected to an output port of the main control chip in the data processing circuit through the isolated $I/O_1$, and is controlled by the main control chip, output terminals $O_1$ and $O_2$ of the analog switch $SW_1$ are connected to a series circuit of the current limiting resistor $R_L$, the reference resistor $R_{ref}$, and the measurement resistor $R_T$; two terminals of the reference resistor $R_{ref}$ and the measurement resistor $R_T$ are connected to the differential and single-ended amplifier circuit to output an voltage signal.

10. The electronic device according to claim 9, wherein in the measurement method, the differential and single-ended amplifier circuit comprises the differential amplifier $A_1$, the differential amplifier $A_2$, and the differential amplifier $A_3$, wherein an input terminal of the differential amplifier $A_1$ is connected to two terminals of the measurement resistor $R_T$, an input terminal of the differential amplifier $A_2$ is connected to two terminals of the reference resistor $R_{ref}$, and output terminals of the differential amplifier $A_1$ and the differential amplifier $A_2$ are connected to an input terminal of the differential amplifier $A_3$; an inverting input terminal and an inverting output terminal of the differential amplifier $A_3$ are connected to the analog-to-digital conversion circuit.

11. The electronic device according to claim 10, wherein in the measurement method, the analog-to-digital conversion circuit comprises a filter resistor $R_f$, a filter capacitor $C_f$, and a multi-channel ADC; a first end of the filter resistor $R_f$ is connected to an output terminal of the differential amplifier $A_3$, and a second end of the filter resistor $R_f$ is connected to a first end of the filter capacitor $C_f$ and a 1 channel of the multi-channel ADC; a second end of the filter capacitor $C_f$ is connected to a 2 channel of the multi-channel ADC; the multi-channel ADC converts an amplified analog voltage signal into a digital signal and is connected to the digital filter circuit.

12. The electronic device according to claim 11, wherein in the measurement method, the digital filter circuit comprises an adjustable sinc filter and the 32-order FIR filter; a digital signal output by the multi-channel ADC is first filtered by the adjustable sinc filter, and then sent to the data processing circuit after entering the 32-order FIR filter and performing a second stage filtering.

13. The electronic device according to claim 12, wherein in the measurement method, the data processing circuit comprises the isolated $I/O_1$, the isolated $I/O_2$, and the main control chip; the output port of the main control chip is connected to the isolated $I/O_1$, and then connected to the selection control terminal S of the analog switch $SW_1$ to realize a switching of a voltage direction; an input port of the main control chip is connected to the isolated $I/O_2$, and then connected to an output port of the 32-order FIR filter to receive data output by the digital filter circuit, and transmit voltage information to a host computer through a serial port.

14. The electronic device according to claim 13, wherein in the measurement method, the isolated filter power supply circuit comprises an analog power supply I, an analog power supply II, and a digital power supply; the analog power supply I supplies power for the bidirectional constant voltage source proportional bridge circuit; the analog power supply II supplies power for the differential and single-ended amplifier circuit, the analog-to-digital conversion circuit, and the digital filter circuit; the digital power supply supplies power for the data processing circuit.

15. A computer readable storage medium, wherein the computer readable storage medium is used for storing computer instructions, and steps of the measurement method according to claim 1 are realized when the computer instructions are executed by a processor.

16. The computer readable storage medium according to claim 15, wherein in the measurement method, the bidirectional constant voltage source proportional bridge circuit comprises the constant voltage source $V_1$, the analog switch $SW_1$, a current limiting resistor $R_L$, the reference resistor $R_{ref}$, and the measurement resistor $R_T$; a positive electrode of the constant voltage source $V_1$ is connected to input terminals A and D of the analog switch $SW_1$, and a negative electrode of the constant voltage source $V_1$ is connected to input terminals B and C of the analog switch $SW_1$; the selection control terminal S of the analog switch $SW_1$ is connected to an output port of the main control chip in the data processing circuit through the isolated $I/O_1$, and is controlled by the main control chip, output terminals $O_1$ and $O_2$ of the analog switch $SW_1$ are connected to a series circuit of the current limiting resistor $R_L$, the reference resistor $R_{ref}$, and the measurement resistor $R_T$; two terminals of the reference resistor $R_{ref}$ and the measurement resistor $R_T$ are connected to the differential and single-ended amplifier circuit to output an voltage signal.

17. The computer readable storage medium according to claim 16, wherein in the measurement method, the differential and single-ended amplifier circuit comprises the differential amplifier $A_1$, the differential amplifier $A_2$, and the differential amplifier $A_3$, wherein an input terminal of the differential amplifier $A_1$ is connected to two terminals of the measurement resistor $R_T$, an input terminal of the differential amplifier $A_2$ is connected to two terminals of the reference resistor $R_{ref}$, and output terminals of the differential amplifier $A_1$ and the differential amplifier $A_2$ are connected to an input terminal of the differential amplifier $A_3$; an inverting input terminal and an inverting output terminal of the differential amplifier $A_3$ are connected to the analog-to-digital conversion circuit.

18. The computer readable storage medium according to claim 17, wherein in the measurement method, the analog-to-digital conversion circuit comprises a filter resistor $R_f$, a filter capacitor $C_f$, and a multi-channel ADC; a first end of the filter resistor $R_f$ is connected to an output terminal of the differential amplifier $A_3$, and a second end of the filter resistor $R_f$ is connected to a first end of the filter capacitor $C_f$ and a 1 channel of the multi-channel ADC; a second end of the filter capacitor $C_f$ is connected to a 2 channel of the multi-channel ADC; the multi-channel ADC converts an amplified analog voltage signal into a digital signal and is connected to the digital filter circuit.

19. The computer readable storage medium according to claim 18, wherein in the measurement method, the digital filter circuit comprises an adjustable sinc filter and the 32-order FIR filter; a digital signal output by the multi-channel ADC is first filtered by the adjustable sinc filter, and then sent to the data processing circuit after entering the 32-order FIR filter and performing a second stage filtering.

20. The computer readable storage medium according to claim 19, wherein in the measurement method, the data processing circuit comprises the isolated $I/O_1$, the isolated $I/O_2$, and the main control chip; the output port of the main control chip is connected to the isolated $I/O_1$, and then connected to the selection control terminal S of the analog switch $SW_1$ to realize a switching of a voltage direction; an input port of the main control chip is connected to the isolated $I/O_2$, and then connected to an output port of the 32-order FIR filter to receive data output by the digital filter circuit, and transmit voltage information to a host computer through a serial port.

* * * * *